United States Patent [19]
Aaen et al.

[11] 3,958,461
[45] May 25, 1976

[54] TRANSMISSION DRIVE PULLEY ASSEMBLY WITH SELECTIVE DRIVE AND INCLUDING RATCHET MECHANISM

[75] Inventors: Olav Aaen, Kenosha, Wis.; Edgar Rose, Glencoe; Anthony Prince, Wauekgan, both of Ill.

[73] Assignee: Outboard Marine Corporation, Waukegan, Ill.

[22] Filed: Sept. 25, 1974

[21] Appl. No.: 509,139

[52] U.S. Cl............................................. 74/230.17 E
[51] Int. Cl.² ....................................... F16H 55/52
[58] Field of Search............ 74/230.17 E, 230.17 M, 74/230.17 F, 230.17 R, 230.17 A, 230.17 B, 230.17 C, 230.17 D, 217 CV; 192/105 B, 103 A

[56] References Cited
UNITED STATES PATENTS

| | | | |
|---|---|---|---|
| 3,362,242 | 1/1968 | Watkins | 74/230.17 E |
| 3,653,283 | 4/1972 | Betz | 74/230.17 F |
| 3,675,500 | 7/1972 | Albertson | 74/230.17 E |
| 3,709,052 | 1/1973 | Lassanske | 74/230.17 E |
| 3,777,583 | 12/1973 | Talbot | 74/230.17 E |
| 3,824,867 | 7/1974 | Brooks | 74/230.17 E |

*Primary Examiner*—Samuel Scott
*Assistant Examiner*—A. Russell Burke
*Attorney, Agent, or Firm*—Michael, Best & Friedrich

[57] ABSTRACT

Disclosed herein is a variable transmission drive pulley assembly comprising a fixed sheave connected to a drive shaft for common rotation therewith, a movable sheave carried by the drive shaft for movement axially thereof relative to a retracted position spaced from the fixed sheave, a spring urging the movable sheave toward the retracted position in the direction away from the fixed sheave, speed responsive fly weights for displacing the movable sheave toward the fixed sheave, a second spring for augmenting the effectiveness of the speed responsive fly weights and a selectively operable control including a ratchet mechanism for regulating operation of the second spring independently of the rate of drive shaft rotations.

16 Claims, 3 Drawing Figures

TRANSMISSION DRIVE PULLEY ASSEMBLY WITH SELECTIVE DRIVE AND INCLUDING RATCHET MECHANISM

BACKGROUND OF THE INVENTION

The invention relates generally to variable transmission drive pulley assemblies such as are used in snowmobiles.

Prior variable transmission drive pulley assemblies are disclosed in the following U.S. Pat. Nos.

Watkins — No. 3,362,242 issued Jan. 9, 1968
Lassanske — No. 3,709,052 issued Jan. 9, 1973

RELATED APPLICATIONS.

Attention is hereby directed to earlier filed U.S. aplication Ser. No. 492,030, filed July 26, 1974 by Olaf Aaen and Edgar Rose (Attorney's Docket No. 2789) which application is incorporated herein by reference.

SUMMARY OF THE INVENTION

The invention provides a variable transmission drive pulley assembly including a fixed sheave connected to a drive shaft for common rotation therewith, together with a movable sheave carried by the drive shaft for common rotation therewith and for movement axially thereof toward and away from the fixed sheave, and means urging the movable sheave away from the fixed sheave. In addition, the pulley assembly includes speed responsive means for displacing the movable sheave toward the fixed sheave, means for modifying the effectiveness of the speed responsive means, and selectively operable control means for controlling operation of the speed responsive means and the means for modifying the effectiveness of the speed responsive means independently of the rate of drive shaft rotation.

In further accordance with one embodiment of the invention, the means for modifying the effectiveness of the speed responsive means is operable to augment the force which is generated by the speed responsive means and which is operable to displace the movable sheave toward the fixed sheave, and the control means is operable to discontinue such force augmentation at a rate of drive shaft rotation above low or idle speeds.

In one embodiment in accordance with the invention, the means for modifying the effectiveness of the speed responsive means comprises a member movable relative to the drive shaft and the control means includes a plurality of serrations on the member and an element selectively movable to a position for engagement with one of the serrations depending upon the location of the member relative to the drive shaft, which engagement of the element with the serration prevents further augmentation of the force which displaces the movable sheave toward the fixed sheave.

In further accordance with the invention, the member comprises a sleeve located in telescopic relation to the drive shaft and movable axially thereof.

A principal feature of the invention is the provision of a variable transmission drive pulley assembly which provides selective operation in "neutral", "trail drive", and "performance drive" conditions and which permits effective shifting from "trail drive" to "performance drive" at drive shaft speeds above low or idle speed.

Another principal feature of the invention is the provision of a variable transmission drive pulley assembly which is economical to manufacture and which will provide reliable service over a long and useful life.

Other features and advantages of the invention will become known by reference to the following general description, claims, and appended drawings.

DRAWINGS

Before explaining the invention in detail, it is to be understood that the invention is not limited in its application to the details of construction and arrangement of parts set forth in the following general description or illustrated in the accompanying drawings, since the invention is capable of other embodiments and of being practiced or carried out in various ways. Also it is to be understood that the phraseology or terminology employed herein is for the purpose of description and not of limitation.

GENERAL DESCRIPTION

Figure 1:
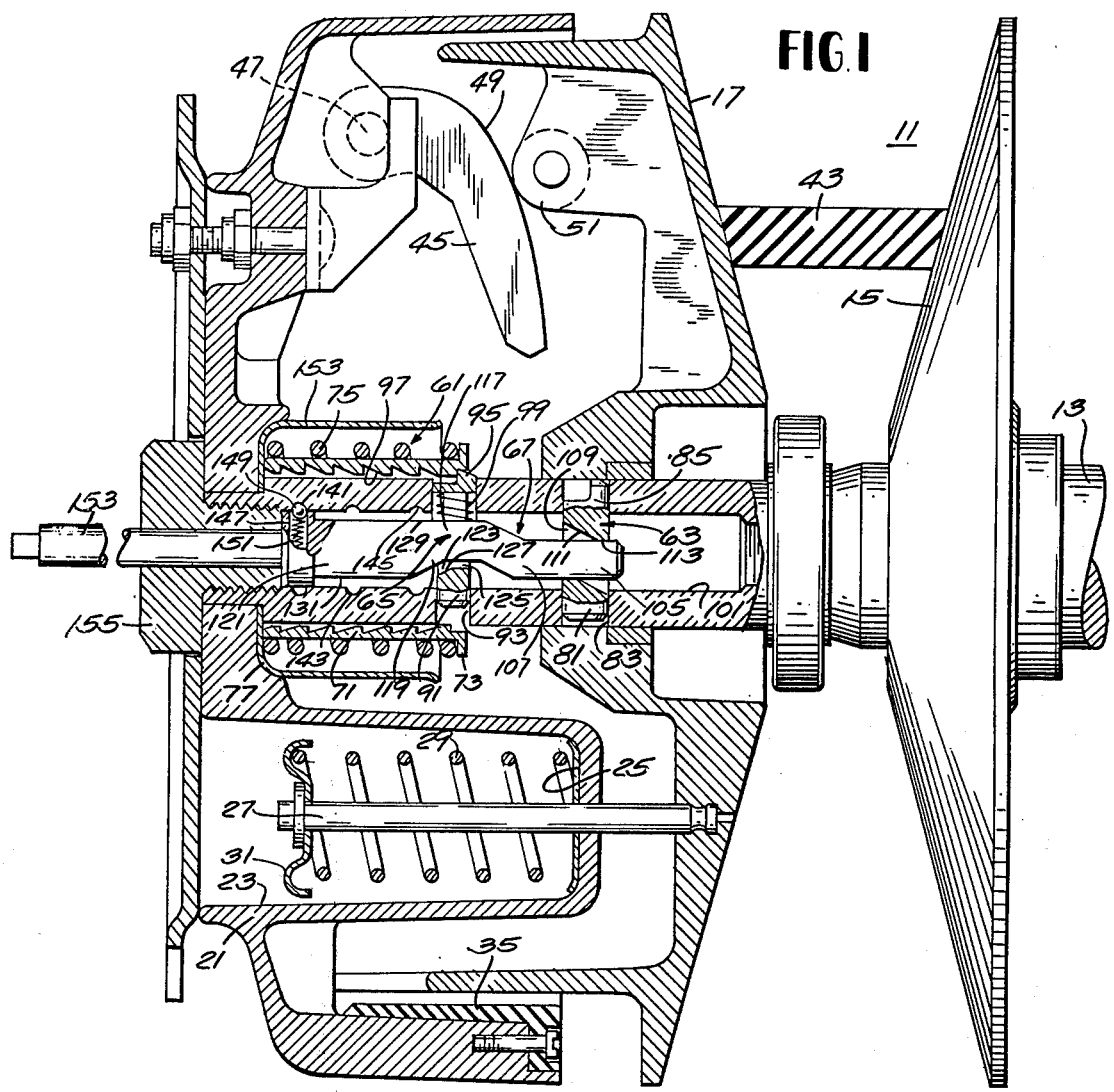
FIG. 1 is a fragmentary elevational view, partially in section, of one embodiment of a variable transmission drive pulley assembly embodying various of the features of the invention and illustrating the components in the "performance drive" condition.
Figure 2:
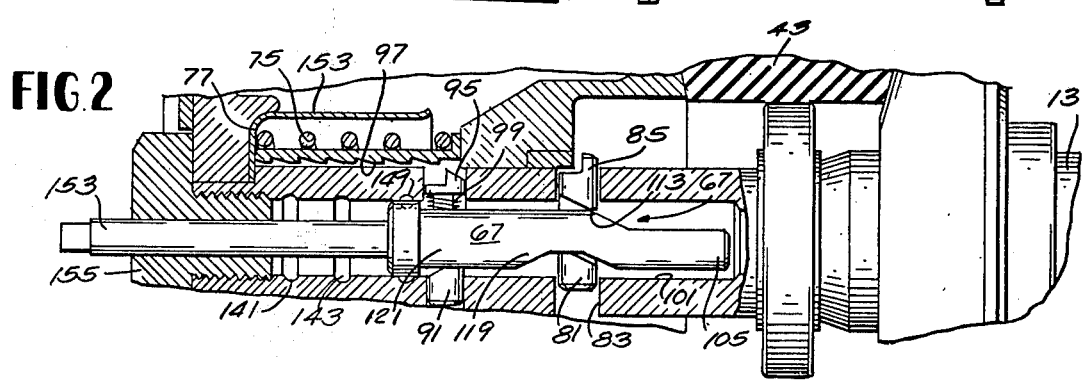
FIG. 2 is a fragmentary view, partially in section, illustrating various of the components of the pulley assembly shown in FIG. 1 in the "neutral" condition.
Figure 3:
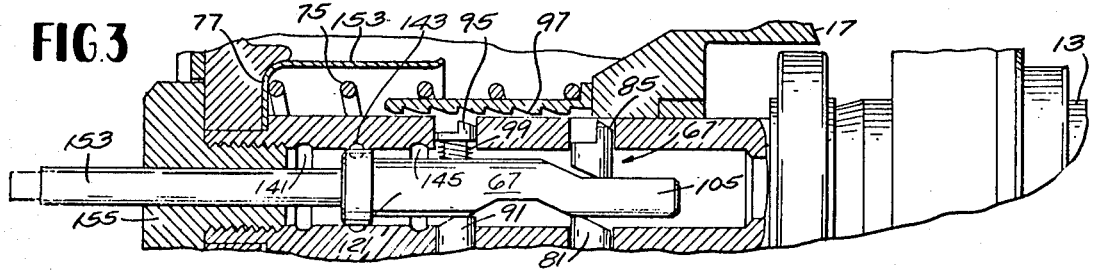
FIG. 3 is a fragmentary view, partially in section, illustrating various of the components of the pulley assembly shown in FIG. 1 in the "trail drive" or "cruise" condition.

Shown in FIGS. 1 through 3 of the drawings is a variable speed transmission or sheave drive 11 which includes a primary or driving shaft 13 rotatably driven by a suitable power source (not shown). Carried on the driving shaft 13 is a sheave 15 which is fixed for common rotation with the driving shaft 13 and against movement axially of the driving shaft 13, together with a movable sheave 17 which is displaceable axially of the driving shaft 13 toward and away from the fixed sheave 15 between retracted and advanced positions, and which is also rotatable in common with the driving shaft 13.

Means are provided for biasing the movable sheave 17 away from the fixed sheave 15. Various arrangements can be employed. In the illustrated construction, such means comprises a cup 21 which is fixed to the drive shaft 13 for common rotation therewith and against axial movement relative thereto and which is formed to include three recesses 23 each having an apertured bottom wall 25 through which a stud 27 projects from the movable sheave 17. Telescopically mounted about each stud 27 is a spring 29 which, at one end, bears against the bottom wall 25 and which, at the other end, bears against a collar 31 fixed to the outer end of the stud 27. Thus the movable sheave 17 is biased by the springs 29 to the left as shown in FIG. 1 and away from the fixed sheave 15. As already indicated other arrangements, such as a spring located in telescopic relation to the drive shaft 13, could be employed for biasing the movable sheave 17 away from the fixed sheave 15.

Various means can be provided for rotating the movable sheave 17 in common with the drive shaft 13. For instance, the movable sheave 17 could be keyed or mounted on a spline. In the illustrated construction, the movable sheave 17 is splined to the cup 21 adjacent the outer periphery thereof as shown at 35 in FIG. 1 and at a maximum distance from the shaft 13 in order to reduce force transmission therebetween.

Means operable in response to rotation of the drive shaft 13 are provided for displacing the movable sheave 17 toward the fixed sheave 15 such that the spacing between the sheaves 15 and 17 decreases as rotational speed increases so as thereby to drive a belt 43 at increasing speed. Various speed responsive means can be employed and, in the illustrated construction, such means comprises one or more eccentrically supported fly weights 45 which (as shown at the top of FIG. 1) are mounted on pivots 47 on the cup 21, which are adapted to swing radially outwardly, i.e., to pivot in the counterclockwise direction in response to drive shaft rotation, and which include a camming part or surface 49 engageable with a reaction roller 51 on the movable sheave 17. Thus, when the drive shaft rotates, the fly weights 45 pivot in the counterclockwise direction, so as to displace the movable sheave 17 toward the fixed sheave 15, i.e., to the right in FIG. 1. The amount of movement of the movable sheave 17 toward the fixed sheave 15 is a function of the force exerted by the fly weights 45 against the reaction rollers 51 which, in turn, is a function of the mass of the fly weights 45 and of the speed of rotation thereof.

In accordance with the invention, means 61 are provided for modifying the effectiveness of the speed responsive means, i.e., by adding to the force generated by the speed responsive means, together with selectively operable control means for controlling both the speed responsive means for displacing the movable sheave 17 toward the fixed sheave 15 and the means for modifying the effectiveness of the speed responsive means. In this regard, the control means is operable independently of the rate of drive shaft rotation and permits discontinuing of the additive modifying force without requiring a decrease in the rate of rotation of the drive shaft to a low or idle speed. In addition, the control means can be remotely actuated, as for instance, by a control element or lever mounted on the steering handle of a snowmobile.

In further accordance with the invention, the selectively operable control means is operable to prevent displacement of the movable sheave 17 toward the fixed sheave 15 by the rotating fly weights 45 regardless of drive shaft rotation, so as thereby to provide a "neutral" condition, to permit modification of the force generated by the speed responsive means by addition of a force in augmentation thereof so as thereby to assist displacement of the movable sheave 17 toward the fixed sheave 15 and thereby to consequently provide a "cruise" or "trail drive" condition in which initiation of driving engagement of the drive belt 43 occurs at a relatively low rate of drive shaft rotation, and to prevent modification of the force generated by the rotating fly weights 45 so as thereby to initiate driving engagement of the belt at a relatively higher rate of rotation and thereby provide a "performance drive" condition. It is particularly noted that the control means is operable at any drive shaft speed to permit discontinuance of the effectiveness of the force modifying means when operating at drive shaft speeds above the speed at which the effectiveness of the force modifying means is discontinued.

Various arrangements can be employed to modify the effectiveness of the speed responsive means. For instance, means can be provided for selectively operably engaging the movable sheave 17 independently of the speed responsive means to apply to the movable sheave 17 a modifying force which can be additive to the movable sheave displacing force applied by the rotating fly weights 45.

Such modifying force can be provided by spring means, or by hydraulic or pneumatic means, or by magnetic means, or by means responsive to attempted torque transmission. When the modifying force is torque responsive, the movable sheave is mounted on the drive shaft 13 for limited relative rotation therebetween, i.e., less than about 180°, but otherwise has rotation with the drive shaft. Such mounting affording limited relative rotation is encompassed by reference in the claims to "common" rotative movement of the movable sheave with the drive shaft.

The means for modifying the effectiveness of the speed responsive means to displace the movable sheave 17 toward the fixed sheave 15 can also include means directly operatively engagable with the speed responsive means to affect the effectiveness thereof. For instance, the mounting of at least one of the components of the speed responsive means can be selectively movably located. Alternatively, additional speed responsive means such as assists fly weights (as distinguished from the before mentioned or primary fly weights (45)) can be employed. Further alternatively, one or more of the primary fly weights 45 can be selectively rendered inoperable. Still further alternatively, such selective employment of speed responsive weights can involve selective use of weights having differing mass or having camming surfaces with differing cam configurations. Still further alternatively, spring means can be selectively applied to the speed responsive means to vary the net force available to displace the movable sheave 17 for a given rate of drive shaft rotation.

The arrangements for applying a modifying force to the movable sheave independently of the speed responsive means or for modifying the net force generated by the speed responsive means and available for application to the movable sheave 17, can be used singularly or in combination.

Various control means can be employed. For instance, displacement of the movable sheave 17 by the speed responsive means can be controlled by directly preventing movement of the movable sheave 17 or by rendering the speed responsive means inoperable. In addition, means can be employed to control the means for modifying the effectiveness of the speed responsive means by directly operably effecting the modifying means.

It is to be understood that the disclosed embodiment is only illustrative of one form of the invention and that the invention extends beyond the specifically illustrated means for modifying the effectiveness of the speed responsive means and beyond the specifically illustrated control means.

While various other arrangements could be employed, in the construction shown in FIGS. 1 through 3, the modifying means 61 for displacing the movable sheave 17 toward the fixed sheave 15 comprises a sleeve 71 located in telescopic relation to the drive shaft 13 and including, at the end thereof adjacent to the movable sheave 17, a circular flange. The sleeve 71 is movable between a retracted position shown in FIGS. 1 and 2 and an advanced position shown in FIG. 3. The modifying means 61 for displacing the movable sheave 17 toward the fixed sheave 15 also includes a helical spring 75 which is located in encircling relation to the sleeve 71 and which is seated, at one end, against the circular flange 73 and, at the other end, is seated against a part 77 of the fixed cup 23. Thus, the spring 75 urges the sleeve 71 toward the advanced position, i.e., to the right in the drawings so as to apply additional force to the movable sheave 17. When the drive shaft 13 is not rotating, the bias of the main springs 29 overpowers the spring 75 so as to automatically displace the sleeve 71 toward the left in the drawings, i.e., to the retracted position shown in FIGS. 1 and 2.

While various other arrangements could be employed, in the construction shown in FIGS. 1 through 3, the control means includes releasable means 63 for preventing movement of the movable sheave 17 toward the fixed sheave 15, and releasable means 65 for preventing sheave displacing operation of the modifying means 61. In addition, there is provided a selectively operable actuator 67 for effecting operation of the sheave movement preventing means 63 and for effecting operation of the releasable means 65 for preventing sheave displacing operation of the modifying means 61.

While various arrangements can be employed, in the construction shown in FIGS. 1 through 3, the sheave movement preventing means 63 comprises an element or member 81 movable in bore 83 extending radially of the drive shaft 13 between a retracted position (See FIGS. 1 and 3), and an advanced or extended position (See FIG. 2) in which an outer end portion 85 extends into position for engagement with the movable sheave 17 to prevent movement of the sheave 17 from its retracted position toward the fixed sheave 15 and thereby provides a "neutral" condition.

In accordance with the invention, the releasable means 65 for preventing sleeve displacement is operable, when the sleeve is fully retracted in response to the action of the spring 29 and when the drive shaft is not rotating or rotating at low speed, to prevent initial movement of the sleeve from the retracted position to the advance position, and is operable, when the sleeve is partially advanced from the retracted position toward the advanced position in response to drive shaft rotation at a speed above low or idling speed, to prevent further movement of the sleeve 71 from the retracted position toward the advanced position. While various other constructions can be employed, in the construction shown in FIGS. 1 through 3, the releasable means comprises an element or member 91 which is located in a radial bore 93 in the drive shaft 13 and which includes an outer tang 95, together with an axially extending series of serrations 97 on the inside surface of the sleeve 71, which serrations 97 are selectively engageable by the tang 95 depending upon the axial location of the sleeve 71.

The sleeve movement preventing member 91 is biased from a retracted position shown in FIGS. 2 and 3 by means in the form of a spring 99 to an extended position shown in FIG. 1 in which the tang 95 is engageable with one of the serrations 97 to prevent sleeve movement to the right, consequent to increasing drive shaft rotation.

While other arrangements could be employed, in the construction shown in FIGS. 1 through 3, the control means includes an axial bore 101 extending in the drive shaft 13 and communicating with each of the radial bores 83 and 93. Located in the axial bore 101 is the actuator or plunger 67 which is movable axially between first, second and third positions corresponding respectively to "neutral", "trail drive" and "performance drive" positions. Included on the actuator or plunger 67 and on the sheave movement preventing member 81 are means for displacing the member 81 between its retracted and advanced positions in accordance with the position of the actuator or plunger 67. Thus the actuator 67 includes a straight inner terminal portion 105 followed by an inclined portion 107, both of which cooperate with an opening 109 located in the member 81 and having inclined and straight wall means 111 and 113 respectively so that when the actuator 67 is in the performance drive and "trail drive" positions (FIGS. 1 and 3) the member 81 is controlled by the straight terminal portion 105 to maintain the member 81 in the retracted position and when the actuator 67 is in the "neutral" position shown in FIG. 2, the sheave movement preventing member 81 is engaged by the inclined portion 107 of the actuator 103 to displace the sheave movement preventing member 81 to its advanced or extended position in engagement with the movable sheave 17 to prevent displacement of the movable sheave 17 toward the right and toward the fixed sheave 15.

Also included on the actuator or plunger 67 and on the sleeve movement preventing member 91 are means for controlling the position of the sleeve movement preventing member 91 in accordance with the positions of the actuator 67. Thus, the actuator 67 includes, adjacent to the inclined portion 107, a neck portion 117, and adjacent to the neck portion 117, a second inclined portion 119 followed by a straight portion 121. Formed in the sleeve movement preventing member 91 is an opening 123 through which the actuator 67 extends and which is defined, in part, by a lower horizontal or straight wall 125 and a lower inclined wall 127.

The before mentioned biasing spring 99 is engaged between the top portion or tang 95 of the sleeve movement preventing member 91 and the upper straight surface or edge 129 of the actuator 67. The actuator portion 121, the spring 99, and the opening 123 in the sleeve movement preventing member 91 are arranged such that when the actuator 67 is in the "neutral" position (See FIG. 2) and in the "trail drive" position (See FIG. 3) the straight lower edge surface 131 of the actuator 67 engages the lower horizontal wall 125 of the opening 123 to retain the sleeve movement preventing member 91 in the retracted position against the action of the spring 99. However, when the actuator 67 is moved to the "performance drive" position, the neck portion 117 of the actuator 67 moves into the opening 123 in the sleeve movement preventing member 91 and permits the spring 99 to extend the sleeve movement preventing member 91 to the advanced position preventing movement of the sleeve 71 to the right (See FIG. 1).

Detent means are provided for yieldably retaining the actuator or plunger 67 in one of the "neutral", "trail drive" or "performance drive" positions. While various arrangements could be employed, in the construction illustrated in FIGS. 1 through 3, such means comprises three axially spaced recesses 141, 143 and 145 included in the wall of the axial bore 101, together with a radial bore 147 in the actuator 67 housing a ball 149 biased outwardly toward the recesses 141, 143 and 145 by a spring 151.

Extending at the left end of the actuator or plunger 67 is an actuating rod 153 which passes through a plug 155 closing the axial bore 101 in the drive shaft 13.

In addition, a guard 153 extends in outward telescopic relation to the spring 75.

In operation, when the actuator or plunger 67 is in the "neutral" position shown in FIG. 2, the sheave movement preventing member 81 is in the advanced position preventing movement of the movable sheave 17 toward the fixed sheave 15 regardless of the rate of rotation of the drive shaft 13 or the axial force applied to the movable sheave 17 by the centrifugal fly weights 45. At the same time, the sleeve movement preventing member 91 is held in its retracted position.

Upon movement of the actuator 67 from the "neutral" position to the "trail drive" position, the sheave movement preventing member 81 is withdrawn from its advanced position to its retracted position and the sleeve movement preventing member 91 is maintained in the retracted position. Accordingly, movement of the sleeve 71 toward the advanced position is permitted, thereby applying to the movable sheave 17 an additional or modifying force in addition to the force applied by the centrifugal fly weights 45, tending to displace the movable sheave 17 toward the fixed sheave 15. Accordingly, the movable sheave 17 will initiate movement to the right in response to a lower rotational speed of the drive shaft 13 then would be the case if the spring 75 were omitted.

In the event that the actuator 67 is moved from the "trail drive" position shown in FIG. 3 to the "performance drive" position, shown in FIG. 1, the sheave movement preventing member 81 is retained in retracted position and the sleeve movement preventing member 91 is permitted to move from its retracted position to its advanced position under the influence of the spring 99. The sleeve movement preventing member 91 will, therefore move into position preventing further movement of the sleeve 71 to the left in response to decreasing drive shaft rotation. With the sleeve 71 prevented from moving to the right, a greater rotational speed, associated with the "performance drive" conditions, is required to effect displacement of the movable sheave 17 toward the fixed sheave 15.

Movement of the actuator 67 from the "performance drive" position to the "trail drive" position effects movement of the sleeve movement preventing member 91 to the retracted position while the sheave movement preventing member 81 is retained in its retracted position. Further movement of the actuator 103 from the "trail drive" position to the "neutral" position serves to retain the sleeve movement preventing member 91 in the retracted position, while the sheave movement preventing member 81 is displaced to the advanced position preventing displacement of the movable sheave 17 toward the fixed sheave 15 regardless of the rate of rotation of the drive shaft 13.

Various of the features of the inventions are set forth in the following claims.

We claim:

1. A variable transmission drive pulley assembly comprising a drive shaft, a fixed sheave connected to said drive shaft for common rotation therewith, a movable sheave carried by said drive shaft for movement axially thereof relative to a retracted position spaced from said fixed sheave, means urging said movable sheave toward said retracted position in the direction away from said fixed sheave, speed responsive means for displacing said movable sheave toward said fixed sheave, means operable independently of said speed responsive means for modifying the effectiveness of said speed responsive means, and selectively operable control means for controlling operation of said speed responsive means and of said means for modifying the effectiveness of said speed responsive means.

2. A variable transmission drive pulley assembly in accordance with claim 1 wherein said means for modifying the effectiveness of said speed responsive means is operable to augment the force which is generated by said speed responsive means and which is effective to displace said movable sheave toward said fixed sheave and wherein said control means is operable to discontinue said force augmentation at a speed level above low or idle speed.

3. A variable transmission drive pulley assembly comprising a drive shaft, a fixed sheave connected to said drive shaft for common rotation therewith, a movable sheave carried by said drive shaft for movement axially thereof relative to a retracted position spaced from said fixed sheave, means urging said movable sheave toward said retracted position in the direction away from said fixed sheave, speed responsive means for displacing said movable sheave toward said fixed sheave, means operable independently of said speed responsive means for modifying the effectiveness of said speed responsive means including a member movable axially relative to said drive shaft, and selectively operable control means for controlling operation of said speed responsive means and of said means for modifying the effectiveness of said speed responsive means, said control means including a plurality of serrations on said member and an element selectively movable to a position for engagement with one of said serrations depending upon the location of said member relative to said drive shaft.

4. A variable transmission drive pulley assembly in accordance with claim 3 wherein said member comprises a sleeve located in telescopic relation to said drive shaft and movable axially thereof.

5. A variable transmission drive pulley assembly in accordance with claim 1 wherein said means for modifying the effectiveness of said speed responsive means includes means operatively engageable directly with said movable sheave independently of said speed responsive means.

6. A variable transmission drive pulley assembly in accordance with claim 1 wherein said means operable independently of said speed responsive means for modifying the effectiveness of said speed responsive means comprises a sleeve located in telescopic relation to said drive shaft and movable axially thereon and engageable with said movable sheave and means biasing said sleeve in one direction axially of said drive shaft.

7. A variable transmission drive pulley assembly comprising a drive shaft, a fixed sheave connected to said drive shaft for common rotation therewith, a movable sheave carried by said drive shaft for movement axially thereof relative to a retracted position spaced from said fixed sheave, means urging said movable sheave toward said retracted position in the direction away from said fixed sheave, speed responsive means for displacing said movable sheave toward said fixed sheave, additional means movable relative to said fixed sheave and independently of said speed responsive means for modifying the effectiveness of said speed responsive means, and control means for selectively preventing displacement of said movable sheave toward said fixed sheave by said speed responsive means and for selectively controlling operation of said additional means for modifying the effectiveness of said speed responsive means.

8. A variable transmission drive pulley assembly in accordance with claim 7 wherein said means for modifying the effectiveness of said speed responsive means is operable to augment the force which is generated by said speed responsive means and which is effective to displace said movable sheave toward said fixed sheave and wherein said control means is operable to discontinue said force augmentation at a speed level above low or idle speed.

9. A variable transmission drive pulley assembly in accordance with claim 7 wherein said means for modifying the effectiveness of said speed responsive means comprises a member movable relative to said drive shaft and wherein said control means includes a plurality of serrations on said member and an element selectively movable to a position for engagement with one of said serrations depending upon the location of said member relative to said drive shaft.

10. A variable transmission drive pulley assembly in accordance with claim 9 wherein said member comprises a sleeve located in telescopic relation to said drive shaft and movable axially thereof.

11. A variable transmission drive pulley assembly in accordance with claim 7 wherein said means for modifying the effectiveness of said speed responsive means comprises a sleeve located in telescopic relation to said drive shaft and movable axially thereon and engageable with said movable sheave and means biasing said sleeve in one direction axially of said drive shaft.

12. A variable transmission drive pulley assembly comprising a drive shaft, a fixed sheave connected to said drive shaft for common rotation therewith, a movable sheave carried by said drive shaft for movement axially thereof toward and away from said fixed sheave, means urging said movable sheave away from said fixed sheave, first means operable in response to rotation of said drive shaft for displacing said movable sheave axially of said drive shaft toward said fixed sheave, second means operable independently of said first means for displacing said movable sheave axially of said drive shaft and control means operable selectively for controlling operation of said first and second means for displacing said movable sheave.

13. A variable transmission drive pulley assembly in accordance with claim 12 wherein said second means for displacing said movable sheave is operable to augment the force which is generated by said first means and which is effective to displace said movable sheave toward said fixed sheave and wherein said control means is operable to discontinue said force augmentation at a speed level above low or idle speed.

14. A variable transmission drive pulley assembly in accordance with claim 12 wherein said second means for displacing said movable sheave comprises a member movable relative to said drive shaft and wherein said control means includes a plurality of serrations on said member and an element selectively movable to a position for engagement with one of said serrations depending upon the location of said member relative to said drive shaft.

15. A variable transmission drive pulley assembly in accordance with claim 12 wherein said member comprises a sleeve located in telescopic relation to said drive shaft and movable axially thereof.

16. A variable transmission drive pulley assembly in accordance with claim 12 wherein said second means for displacing said movable sheave comprises a sleeve located in telescopic relation to said drive shaft and movable axially thereon and engageable with said movable sheave, and means biasing said sleeve in one direction axially of said drive shaft.

* * * * *